Patented Apr. 16, 1940

2,197,044

UNITED STATES PATENT OFFICE 2,197,044

VAT DYESTUFFS

Ernst Honold, Frankfort-on-the-Main, Heinrich Neresheimer, Ludwigshafen-on-the-Rhine, Max Schubert, Frankfort-on-the-Main, Berthold Stein, Mannheim, and Hans Reich, Ludwigshafen-on-the-Rhine, Germany, assignors to General Aniline & Film Corporation, a corporation of Delaware No Drawing. Application October 8, 1938, Serial No. 233,978. In Germany October 14, 1937

6 Claims. (Cl. 260—152)

The present invention relates to vat dyestuffs containing azo groups.

We have found that vat dyestuffs of valuable properties are obtained by treating vattable compounds which contain an aminoaryl group on a six-membered ring formed only of carbon and nitrogen atoms with oxidizing agents.

The six-membered ring containing nitrogen may be for example a pyridine, pyrimidine or pyrazine ring and it may contain, in addition to the aminoaryl group, for example halogen atoms, alkyl, aryl, hydroxy or etherified hydroxy groups or attached rings, as for example benzene or polymethylene rings. It may be attached to a radicle of the anthraquinone, naphthoquinone, anthrone, indigo or thioindigo series or a still higher ring group. The aminoaryl group may belong for example to the benzene, naphthalene or diphenyl series.

As initial materials there may therefore be mentioned for example aminoaryl derivatives of 1.2-, 2.1- or 2.3-pyridino-, pyrimidino- and -pyrazino-anthraquinones, -naphthoquinones, -1.9-pyrazolanthrones, -1.9-isothiazolanthrones, -1.9-pyrimidinoanthrones and also of anthrones which contain a six-membered ring containing nitrogen only in 1.9-position, as for example of 1.9-pyridino-, 1.9-pyrimidino- or 1.9-pyridazino-anthrones.

As oxidizing agents there may be mentioned for example chromic acid, manganic acid, permanganic acid, hypochlorous and hypobromous acids. They may be allowed to act in acid, neutral or alkaline media. In many cases it is preferable to carry out the preparation of the initial materials, for example by reduction of the corresponding nitro compounds, in one operation with their further treatment.

In so far as the amino compounds used as initial materials themselves have dyestuff properties, the oxidation to the new dyestuffs may also be carried out on the fibre, for example by treatment of the dyeing with hypochlorite solution. Nitrous acid or substances yielding the same under the reaction conditions are unsuitable for the oxidation because they have a diazotizing action.

The new dyestuffs are distinguished by high fastness, in particular by an excellent fastness to light. They are usually soluble only with great difficulty in organic solvents.

The following examples will further illustrate how the said invention may be carried out in practice but the invention is not restricted to these examples. The parts are by weight.

Example 1

Sodium hypochlorite solution is added while heating to a suspension of finely divided para-aminophenyl - 2 - (N) .1 - pyridinoanthraquinone (obtained by the reduction of the para-nitro-phenyl-2(N).1-pyridinoanthraquinone of the constitution:

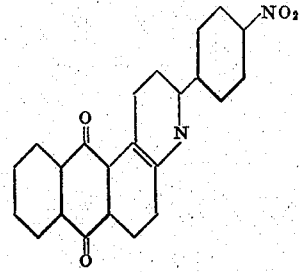

with sodium sulphide in an alkaline liquid—beautiful brown needles from nitrobenzene which dissolve in sulphuric acid giving a greenish yellow coloration) until the original red-brown precipitate has acquired a pure yellow color.

Instead of acidified hypochlorite solution, there may also be used for example free chlorine, alkaline hypochlorite or hypobromite solutions, aqueous permanganate solutions, or chromic anhydride in glacial acetic acid.

The new vat dyestuff dyes cotton brown-yellow shades from a violet-red vat. It is a yellow meal which dissolves in strong sulphuric acid giving a yellow coloration.

By starting from the corresponding meta-nitro compound instead of from the para-nitro compound, a dyestuff is obtained having quite similar properties. Its dyeing on cotton is pale yellow.

Example 2

Para-nitrophenyl - 2.3 - hydroxypyrimidinoanthraquinone:

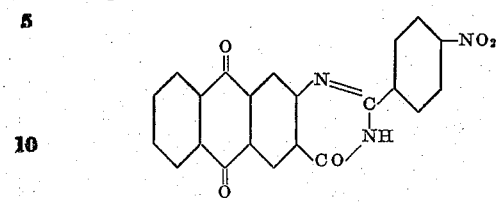

(obtainable from 2-aminoanthraquinone-3-carbonamide and para-nitrobenzoyl chloride—yellow needles from nitrobenzene which dissolve in sulphuric acid giving a yellow-red coloration) is vatted at 50° C. with alkaline sodium hydrosulphite solution and an aqueous solution of potassium permanganate is added to the vat until the latter is no longer used up. The liquid is boiled for a short time, the mass is filtered by suction while hot and the deposited pyrolusite removed therefrom in dilute acetic acid suspension by the addition of bisulphite.

The vat dyestuff obtained dyes cotton clear, fast yellow shades from a red-brown vat.

If a nitro compound of the formula

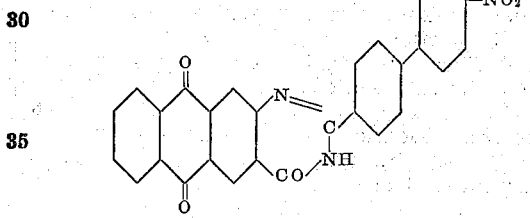

(obtainable from 2-aminoanthraquinone-3-carbonamide and para-para'-nitrodiphenyl-carboxylic acid chloride) is employed, a vat dyestuff of similar properties is obtained.

Example 3

A vat at 50° C. of 3 parts of para-nitrophenyl-1(N).2-hydroxypyrimidinoanthraquinone:

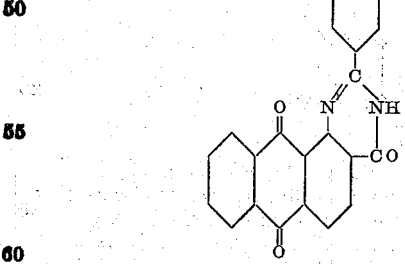

(obtainable by the action of para-nitrobenzoyl chloride on 1-aminoanthraquinone-2-carbonamide in nitrobenzene—brown needles from nitrobenzene dissolving in strong sulphuric acid to give a green-yellow coloration), 20 parts of 35 per cent caustic soda solution, 10 parts of hydrosulphite and 170 parts of water is poured while stirring into a mixture of 100 parts of sodium hypochlorite solution containing 12 per cent of active chlorine and 400 parts of water. The whole is heated to boiling for a short time and the residue is filtered off by suction while hot.

The dyestuff dyes cotton brown-yellow shades from a red-brown vat.

If there be used, instead of the above mentioned compound, the N-methyl compound:

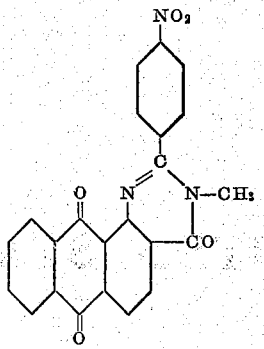

(obtainable from para-nitrobenzoyl chloride and 1-aminoanthraquinone-2-carbonmethylamide by boiling in nitrobenzene—yellow needles from nitrobenzene dissolving in strong sulphuric acid to give a yellow coloration), a dyestuff is obtained which yields pale yellow dyeings on cotton.

Example 4

10 parts of finely dispersed 4'-nitro-PyC-phenyl-1.9-anthrapyrimidine (obtainable by condensing 1-aminoanthraquinone with 4-nitrobenzomethylimide chloride in the presence of nitrobenzene) are added to a solution of 14 parts of stannous chloride in 200 parts of 5 per cent sodium hydroxide solution. The mixture is then heated at from 85° to 95° C. until the nitro compound has completely reacted. The resulting product is sucked off, washed, dried and purified by redissolution from concentrated sulfuric acid. The sulfate obtained thereby is treated with dilute aqueous ammonia. The azo compound thus obtained is a yellow powder which is difficultly soluble in organic solvents. It dissolves in concentrated sulfuric acid giving a golden-yellow coloration and dyes cotton from a brownish-red vat reddish yellow shades.

Example 5

10 parts of finely dispersed 5-benzoylamino-4'-nitro-PyC-phenyl-1.9-anthrapyrimidine (obtainable by condensing 1-amino-5-benzoylaminoanthraquinone with 4-nitrobenzomethylimide chloride in the presence of nitrobenzene) are added to a solution of 14 parts of stannous chloride in 150 parts of 5 per cent sodium hydroxide solution. The mixture is heated at from 85° to 95° C. until the nitro compound has disappeared. The dyestuff is then filtered off by suction, washed and dried. By heating its solutions in concentrated sulfuric acid at from 100 to 110° C., the two benzoyl groups are split off. The diamino compound is then precipitated from the sulfuric acid solution by adding water. The remainder of sulfuric acid is removed by washing out with dilute aqueous ammonia. The dry compound is then treated with benzoyl chloride whereby the two amino groups are reconverted into benzoylamino groups. The new azo compound forms beautiful yellow needles which are difficultly soluble even in high boiling organic solvents. The dyestuff is, however, soluble in concentrated sulfuric acid giving a yellowish-red coloration and dyes cotton from a brownish-red vat yellow shades.

Example 6

90 parts of sodium hydroxide solution of 40° Baumé strength are added to a suspension of 23 parts of 2'-nitrophenyl-1(N).2-pyridinoanthraquinone (obtainable by condensing 1-aminoanthraquinone-2-aldehyde with phenylacetaldehyde and treating the resulting 2'-phenyl-1(N).2-pyridinoanthraquinone with nitric acid in the presence of sulfuric acid monohydrate) in 1150 parts of water and the mixture is heated at from 40° to 45° C. By adding 30 parts of pyridine and 60 parts of sodium hydrosulfite a brownish-red vat of the amino compound formed is obtained. After a short time, from 1000 to 1200 parts of a sodium hypochlorite solution having 10 per cent of active chlorine is allowed to flow in and the temperature is raised to 90° C. After further heating for a short time at 90° C. the resulting dyestuff is sucked off, washed and dried. It may be purified by way of its sulfate. It dissolves in concentrated sulfuric acid giving a reddish-orange coloration and dyes cotton from a brownish-red vat yellow shades.

What we claim is:

1. A vat dyestuff corresponding to the general formula

X—ar—N=N—ar—X wherein X represents a para-quinoid polynuclear radicle built up by the adding-on of a six-membered ring having only carbon and nitrogen as ring members, to an anthraquinonic nucleus in positions selected from the 1.2-, the 2.3- and the 1.9-positions of the said anthraquinone nucleus; and ar an arylene ring having up to two non-condensed benzene nuclei, the radicle ar being combined with the said six-membered nitrogenous ring present in X the groups X—ar— being the same on both sides of the azo bridge.

2. A vat dyestuff of the general formula

A—R—ar—N=N—ar—R—A wherein A represents an anthraquinonic nucleus and R a pyridine ring, two carbon ring members of A and R being common to both, and ar an arylene ring having up to two non-condensed benzene nuclei, the groups A—R—ar being the same on both sides of the azo bridge.

3. A vat dyestuff of the general formula

A—R—ar—N=N—ar—R—A wherein A represents an anthraquinonic nucleus and R a pyrimidine ring, three carbon ring members of A and R being common to both, and ar an arylene ring having up to two non-condensed benzene nuclei, the groups A—R—ar being the same on both sides of the azo bridge.

4. The vat dyestuff of the formula

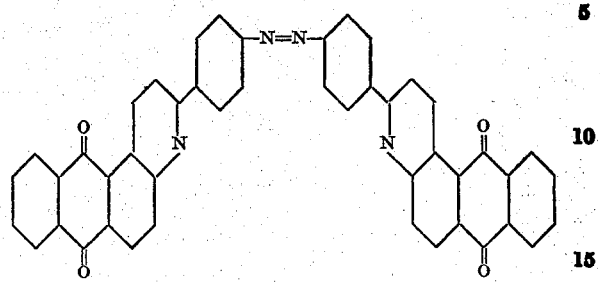

5. The vat dyestuff of the formula

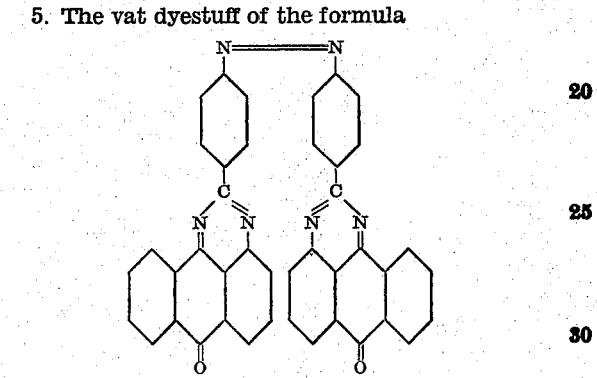

6. The vat dyestuff of the formula

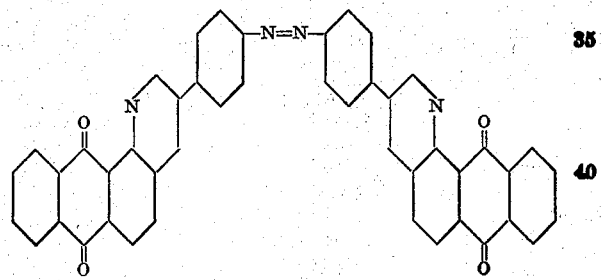

ERNST HONOLD.
HEINRICH NERESHEIMER.
MAX SCHUBERT.
BERTHOLD STEIN.
HANS REICH.